(12) United States Patent
Snyder et al.

(10) Patent No.: US 7,096,340 B1
(45) Date of Patent: Aug. 22, 2006

(54) MEMORY MANAGEMENT

(75) Inventors: Warren S. Snyder, Snohomish, WA (US); Eric D. Blom, Lynnwood, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 331 days.

(21) Appl. No.: 10/304,389

(22) Filed: Nov. 25, 2002

(51) Int. Cl.
*G06F 12/00* (2006.01)

(52) U.S. Cl. .................. 711/202; 711/206; 711/208

(58) Field of Classification Search .............. 711/202, 711/203, 206, 208, 220
See application file for complete search history.

(56) References Cited

U.S. PATENT DOCUMENTS

| | | | | |
|---|---|---|---|---|
| 4,685,125 A | * | 8/1987 | Zave ............................. 700/1 |
| 6,023,750 A | * | 2/2000 | Hansen et al. ............... 711/220 |
| 6,504,785 B1 | * | 1/2003 | Rao ....................... 365/230.05 |
| 6,745,307 B1 | * | 6/2004 | McKee ........................ 711/163 |

\* cited by examiner

*Primary Examiner*—Pierre M. Vital
*Assistant Examiner*—Mano Padmanabhan

(57) ABSTRACT

One embodiment of the present invention provides a method of memory management. Within the present embodiment, a page register along with supporting logic allows a mode to be selected by a processor at the same time it specifies a particular memory page. The selected mode defines what the subsequent use of the specified memory page will be. For example, this method may decrease overhead when moving between different memory pages by providing a mode that automatically returns to a previous page after a specified page has been accessed.

16 Claims, 3 Drawing Sheets

MEMORY MANAGEMENT

TECHNICAL FIELD

The present invention generally relates to the field of memory.

BACKGROUND ART

Modern research and technology have provided society with a wide variety of electronic devices. It is appreciated that some of these modern electronic devices are very powerful and useful to their users. For example, some of the electronic devices which fall into this category include: computers which occupy large office space down to computers which are held in one's hand, satellites which orbit around the earth relaying a multitude of communication signals, microwave ovens capable of quickly cooking food, global positioning system (GPS) devices capable of determining the specific locations of their users on the earth, cellular phones which enable their users to wirelessly communicate with other people, to name a few.

Additionally, it should be appreciated that some modern electronic devices also provide entertainment to their users. For instance, some of the electronic devices which fall into this category include: portable and fixed radio receivers which provide their users music along with a wide array of different audio programming, video game consoles which challenge their users with varying situations within different virtual realities, portable and fixed compact disc (CD) players which provide music to their users, portable and fixed televisions which provide a wide variety of visual and audio programming to their users, and video cassette recorders (VCRs) which enable their users to record television shows for later viewing and also enable them to watch (for example) prerecorded movies on a television set.

One of the enabling components of several of the above mentioned modern devices is a microcontroller or MCU. Specifically, the microcontroller is typically defined as a single chip (integrated circuit) that includes a processor, volatile memory such as random access memory (RAM), non-volatile memory such as read only memory (ROM), clocking source, and an input/output control unit. As such, the microcontroller is a computer on a chip. It should be appreciated that microcontrollers have been utilized in various applications for many years. Primarily, microcontrollers are used in control-oriented applications that are interrupt-driven, sensing and controlling external events. Microcontrollers are frequently found in a wide variety of devices and applications.

For example, microcontrollers may be found in appliances such as microwave ovens, refrigerators, televisions, VCRs, and stereos. Furthermore, microcontrollers may also be found within computer equipment such as laser printers, modems, and disk drives. Additionally, microcontrollers may be found within automobiles (e.g., engine control, diagnostics, climate control), environmental control devices (e.g., greenhouse, factory, home), aerospace, and thousands of other uses.

It should be understood that while a microcontroller may have sufficient memory to store data utilized by its processor, it may not be able to address all of the memory locations at once. For example, a microcontroller that has 8-bits of addressing can usually only address up to 256 memory locations. However, various techniques have been implemented in order to get around this limitation.

In one conventional technique, memory pages are directly swapped. For example, a register forms the high order of the address. As such, the active page is selected by writing to this register. Unfortunately, usually only one memory page is active at a time. Since the processor and the instruction stream have to issue an instruction to select the memory pages, all subsequent instructions operate within the current memory page. Thus, it is very difficult to pass information between memory pages.

Another conventional technique reserves a portion of each page (e.g., memory bank) as a shared area. For example, all memory banks may have an 8 byte hole which is reserved for shared data. Whenever a given memory bank is selected (energized), an 8 byte hole is selected (energized) in all of the memory banks. While this technique allows data to be copied back and forth between memory pages, it limits the available memory in each page.

SUMMARY OF THE INVENTION

Accordingly, a need exists for a way to enable a microcontroller to pass information between its memory pages while not reducing the available memory within each memory page. The present invention satisfies the above mentioned need.

For example, one embodiment of the present invention provides a method of memory management. Within the present embodiment, a page register along with supporting logic allows a mode to be selected by a processor at the same time it specifies a particular memory page. The selected mode defines what the subsequent use of the specified memory page will be. For example, this method may decrease overhead when moving between different memory pages by providing a mode that automatically returns to a previous page after a specified page has been accessed.

In another embodiment, the present invention includes a method of memory management. The method includes mapping a page in memory to an address space based on values in a register. Additionally, the method includes associating a mode specified by values in the register with the page. The method also includes applying the mode to an operation involving the page.

In yet another embodiment, the present invention includes a circuit for providing memory management. The circuit includes a register for storing a first value associated with a page in memory and for storing a second value corresponding to a mode associated with the page. Furthermore, the circuit includes a logic circuit coupled to the register and the page. The logic circuit is for applying the mode to an operation involving the page.

In still another embodiment, the present invention includes a system for providing memory management. The system includes means for mapping a memory page to an address space based on a first value within a register. Moreover, the system includes means for correlating a mode specified by a second value within the register with the memory page. Furthermore, the system includes means for applying the mode to an operation involving the memory page.

While particular embodiments of the present invention have been specifically described within this summary, it is noted that the invention is not limited to these embodiments. The invention is intended to cover alternatives, modifications and equivalents which may be included within the spirit and scope of the invention as defined by the Claims.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
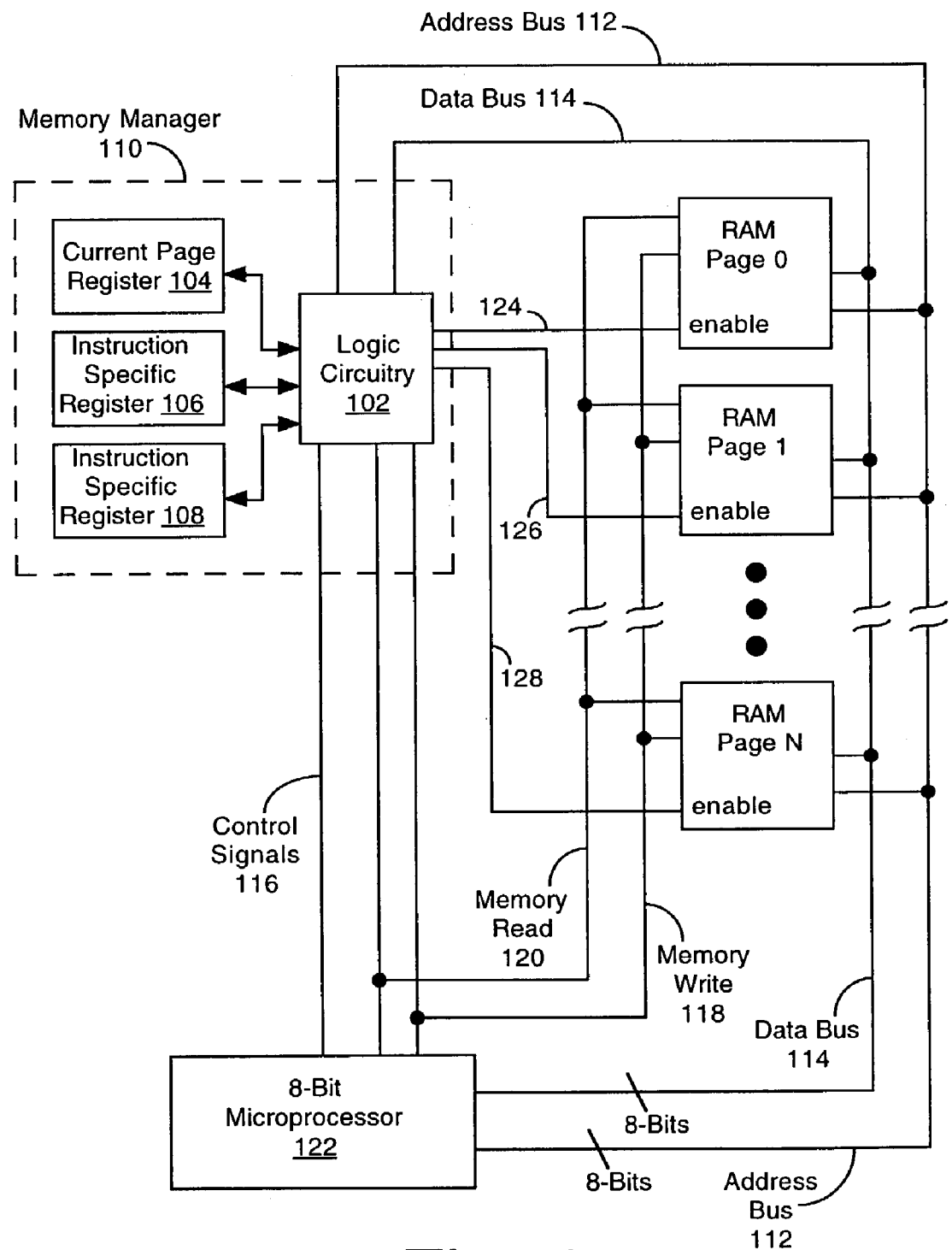
FIG. 1 is a block diagram of an exemplary architecture that includes a memory manager circuit in accordance with an embodiment of the present invention.

Reference will now be made in detail to embodiments of the present invention, examples of which are illustrated in the accompanying drawings. While the present invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a microcontroller or electronic computing device. These descriptions and representations are the means used by those skilled in the art to most effectively convey the substance of their work to others skilled in the art. A procedure, logic block, process, etc., is herein, and generally, conceived to be a self-consistent sequence of steps or instructions leading to a desired result. The steps may involve physical manipulations of physical quantities. Usually, though not necessarily, these physical manipulations take the form of electrical or magnetic signals capable of being stored, transferred, combined, compared, and otherwise manipulated in a microcontroller or electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "mapping", "associating", "applying", "accessing", "correlating", "receiving", "retrieving", "determining", "controlling", "transmitting", "generating", "utilizing", "storing", "outputting", "issuing" or the like, refer to the action and processes of a microcontroller or electronic computing device, that manipulates and transforms data. For example, the data may be represented as physical (electronic) quantities within the microcontroller's (or electronic computing device's) registers and/or memories and is transformed into other data similarly represented as physical quantities within the microcontroller's (or electronic computing device's) memories and/or registers or other such information storage and/or transmission device.

Exemplary Hardware in Accordance with the Present Invention

FIG. 1 is a block diagram of an exemplary architecture 100 that includes a memory manager circuit 110 in accordance with an embodiment of the present invention. The memory manager circuit 110 enables a mode to be selected by a microprocessor 122 at the same time it specifies a particular memory page, e.g., RAM (random access memory) page 1, that it desires to perform an operation with. It should be understood that the selected mode defines what the subsequent use of the specified memory will be.

For example, the memory manager 110 decreases overhead when more than one page of memory is utilized by providing a mode (e.g., "autopop") that automatically returns to a previous memory page after a specified memory page has been accessed. It is appreciated that this is one of many modes that may be implemented as part of memory manager circuit 110. As such, the memory manager 110 provides an efficient way to execute instructions while utilizing more than one memory page and allows for efficient data transfer between memory pages. Furthermore, all of the pages of memory (e.g., RAM pages 0, 1 and N) are usable since the memory manager 110 is not resident to any of the memory locations that it manages. It is noted that architecture 100 may be implemented as part of a microcontroller. However, architecture 100 may be implemented in a wide variety of ways in accordance the present embodiment and is not in any way limited to such an implementation.

Within the present embodiment, software code operating on the microprocessor 122 causes it to transmit the address of a current page register 104 to logic circuitry 102 via address bus 112. The current page register 104 and the logic circuit 102 are part of the memory manager 110. Additionally, the software code causes microprocessor 122 to transmit data to the logic circuitry 102 via a data bus 114. It is noted that this transmitted data indicates which memory page (e.g., RAM page) the software code desires to perform an operation with along with a specified mode that will accompany the requested memory page. For example, if 8 bits of data were transmitted, the first 4 bits of data may be utilized to indicate the current (or active) RAM page while the last 4 bits of data define the desired mode.

Upon reception of the transmitted address and data, the logic circuitry 102 determines from the address on address bus 112 that the transmitted data on data bus 114 is intended for current page register 104. As such, the logic circuitry 102 enables the transmitted data on data bus 114 to be written into the current page register 104. Subsequently, the logic circuitry 102 reads the newly written data within the current page register 104 and determines what the current memory page should be along with what specific mode it will be implementing.

For example, if the data within the current page register 104 of FIG. 1 indicates that RAM page 1 should be the current page, the logic circuitry 102 then determines that it should assert an enable line 126 which is coupled to activate RAM page 1 thereby causing it to be the current (or active) memory page. Additionally, the logic circuitry 102 also reads the data associated with the desired mode contained within current page register 104. Once read, the logic circuitry 102 is then able to determine which predefined mode to implement in association with the current (or active) memory page.

Figure 2:
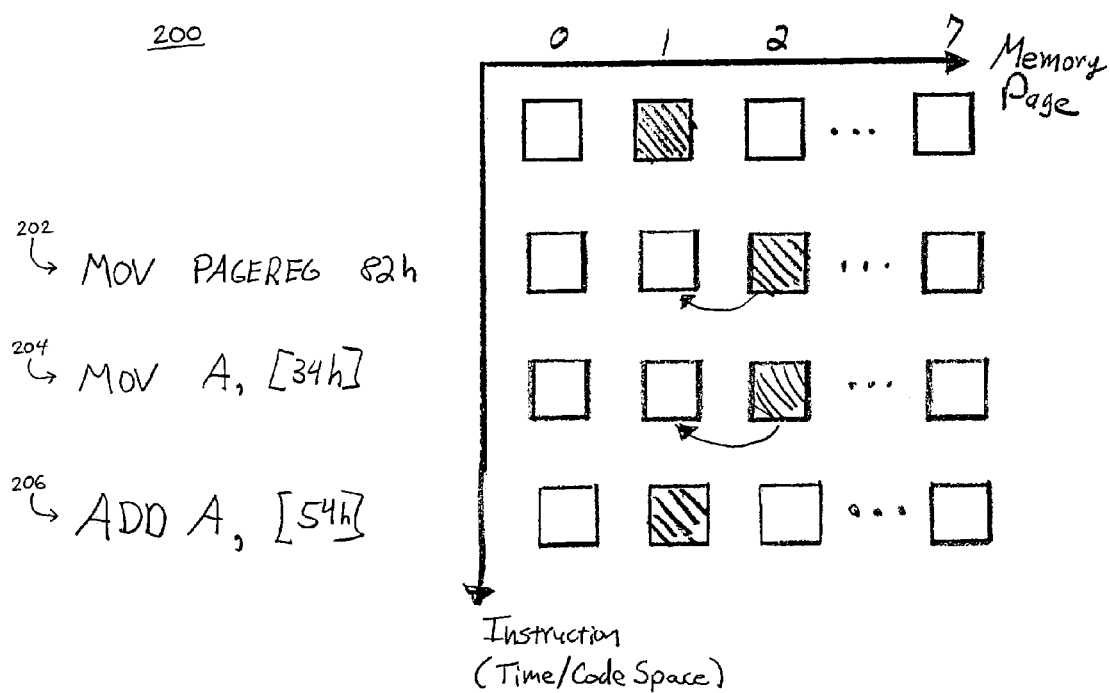
FIG. 2 is a diagram illustrating an exemplary mode that may be implemented in accordance with an embodiment of the present invention.

FIG. 2 is a diagram 200 illustrating an exemplary mode that may be implemented in accordance with an embodiment of the present invention. The mode represented in diagram 200 may be referred to as an "autopop" mode. It is noted that FIG. 2 is described in combination with FIG. 1 in order to more thoroughly understand these embodiments of the present invention.

Initially, as shown in diagram 200 of FIG. 2, memory page 1 is active which is represented by a shaded box within the top row. The first instruction 202 is a move current page register (MOV PAGEREG) instruction and the value is set to 82 in hexadecimal. It is noted that instruction 202 may be issued by microprocessor 122 to the current page register 104 as described herein. The 8 of the 82h may indicate the setting of the autopop bit while the 2 may indicate the setting of the desired memory page. As such, instruction 202 sets the page register 104 to the autopop mode and specifies that memory page 2 is active for the next memory access which is represented by the shaded box in the second row from the top. The arrow shown from memory page 2 to memory page 1 indicates that the previous page is to automatically become the active memory page after the memory access in page 2.

When the next memory access occurs, memory page 2 is read or written, as it is the specified memory page. It is understood that this could occur many instructions later, although those intervening instructions are not shown. Within diagram 200, the next memory access occurs with an instruction 204 which is a move (MOV) instruction that accesses memory location 34 (in hexadecimal) within memory page 2. Specifically, the move instruction 204 goes out to memory page 2, address 34*h*, and gets a value and puts it in A. It is understood that instruction 204 may be issued by the microprocessor 122.

Within FIG. 2, the autopop function then causes the current page register 104 to automatically be restored to the previous memory page (e.g., page 1) as the active page which is represented by the shaded box in the bottom row. Accordingly, the next memory access will be within memory page 1. Within diagram 200, the next memory access is an instruction 206 which is an add (ADD) instruction that goes out to memory page 1, location 54*h*, and gets the value and adds it to the value within A. It is appreciated that instruction 206 may be issued by the microprocessor 122. One of the advantages of the autopop mode is that no instruction from microprocessor 122 was needed between instruction 204 and instruction 206 in order to restore memory page 1 as the page to be accessed by the ADD instruction 206.

Within the example shown in diagram 200, it should be understood that without the autopop function, a conventional process would have microprocessor 122 rewrite the current page register 104 in order to restore memory page 1 which would use additional number of clock cycles and instructions of microprocessor 122. Therefore, the autopop mode (and any other modes) is designed to minimize the number of instructions issued by the microprocessor 122 thereby minimizing the time it takes to perform an operation.

It should be understood that the autopop mode of FIG. 2 may be implemented as part of logic circuitry 102. As such, the logic circuitry 102 performs the autopop function as described herein. Furthermore, the logic circuitry 102 is well suited to be implemented with any type of mode. If a desirable sequence of events is predictable, it may be implemented within the logic circuitry 102 as a specific mode that it can perform. For example, a mode may be implemented within logic circuitry 102 that automatically restores a previously accessed memory in a manner similar to the autopop mode after a defined amount of operations. Alternatively, a mode may be implemented within logic circuitry 102 that automatically restores a previously accessed memory in a manner similar to the autopop mode after a defined amount of accesses to the active memory page. These are only a few of the many different modes that may be implemented within the logic circuitry 102.

Within FIG. 1, the logic circuitry 102 may be implemented in a wide variety of ways in accordance with the present embodiment. For example, the logic circuitry 102 may be implemented with one or more hardware state machines. It is appreciated that any desired mode (e.g., autopop) to be performed by the logic circuitry 102 may be implemented as one or more state machines within logic 102.

As shown in architecture 100, the logic circuitry 102 is coupled to enable (or activate) RAM page 0 via enable line 124 and RAM page N via enable line 128. In this manner, the logic circuitry 102 is able to control which RAM page is the current (or active) memory page. Once a RAM page (e.g., page 0, page 1 or page N) is enabled by logic circuitry 102, it is able to receive data from the data bus 114 and addresses from address bus 112 which are both coupled to each RAM page. Furthermore, once enabled by logic 102, a RAM page (e.g., page 0, page 1 or page N) is able to allow either a memory read operation via memory read line 120 and a memory write operation via a memory write line 118 which are also coupled to each RAM page. It is noted that architecture 100 of the present embodiment may be implemented with any number of RAM pages. The logic circuitry 102 is also coupled to the address bus 112, the data bus 114, a control signals line 116, the memory write line 118, the memory read line 120 and instruction specific registers 106 and 108.

Within FIG. 1, it is appreciated that the instruction specific registers 106 and 108 each receives desired memory page indications from the microprocessor 122 in a manner similar to the current page register 104 described herein. However, each of the instruction specific registers 106 and 108 is implemented to operate with a certain predefined instruction. For example, the instruction specific registers 106 and 108 may each be implemented with one or more instructions that access memory multiple times in one instruction. Additionally, the memory page indicator (e.g., page bits) determine which RAM page is used for the second memory access within the instruction. It is appreciated that the present embodiment is well suited to have more instruction specific registers than the two shown and may also have none.

It is noted that the control signals line 116 coupled between the logic circuitry 102 and the microprocessor 122 is associated with the instruction specific registers 106 and 108. Specifically, the control signals 116 enable the logic 102 to utilize the instruction specific registers 106 and 108. The control signal line 116 represents a few signals that the logic circuitry 102 receives in order to determine whether or not it should use one of the instruction specific registers 106 and 108 or current page register 104. For example, the control signal line 116 may indicate to the logic circuitry 102 whether it should be using the current page register 104 to enable a specific RAM page or to allow one of the instruction specific registers 106 and 108 to determine which RAM will be enabled.

Within FIG. 1, the microprocessor 122 is coupled to address bus 112, data bus 114, memory write line 118, memory read line 120 and the control signals line 116. It is understood that microprocessor 122 may be implemented in diverse ways in accordance with the present embodiment. For example, the microprocessor 122 may be implemented as an 8-bit microprocessor. However, microprocessor 122 may be implemented as any type of processor. The address bus 112 and data bus 114 may be implemented in a wide variety of ways in accordance with the present embodiment. For example, the address bus 112 and data bus 114 may each be implemented as an 8-bit bus. However, the address bus 112 and the data bus 114 may each be implemented as any type of bus.

Exemplary Operation in Accordance with the Present Invention

Figure 3:
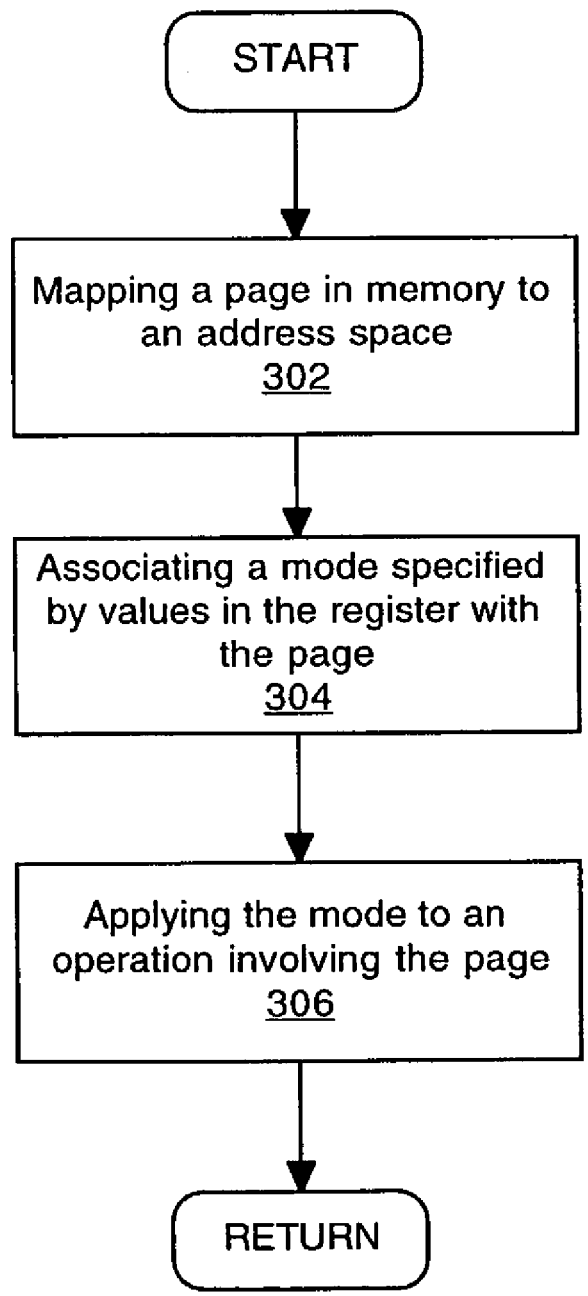
FIG. 3 is a flowchart of steps performed in accordance with an embodiment of the present invention for providing memory management.

FIG. 3 is a flowchart 300 of steps performed in accordance with an embodiment of the present invention for providing memory management. Flowchart 300 includes processes of the present invention which, in one embodiment, may be carried out by hardware, by software or by any combination of hardware and software. The software (or computer readable and computer executable instructions) may reside, for example, in data storage features such as computer usable volatile memory, computer usable non-volatile memory and/or computer usable mass data storage. However, the computer readable and computer executable instructions may reside in any type of computer readable medium. Although specific steps are disclosed in flowchart 300, such steps are exemplary. That is, the present embodiment is well suited to performing various other steps or variations of the steps recited in FIG. 3.

The present embodiment provides a method for providing memory management. For example, a memory page is mapped to an address space based on a first value within a register. Additionally, a mode specified by a second value within the register is associated with the memory page. Furthermore, the mode is applied to an operation involving the memory page. It is understood that the mode may include, but is not limited to, any of the modes described herein. Moreover, the operation involving the memory page may include, but is not limited to, a read operation, a write operation, an arithmetic operation, a logical operation, and/or a move operation.

At step 302 of FIG. 3, a page in memory is mapped to an address space. It is understood that the mapping of the memory page in step 302 to an address space may be implemented in a wide variety of ways in accordance with the present embodiment. For example, the memory page may be mapped at step 302 to an address space based on a first value located within a register (e.g., 104). It is appreciated that the mapping of the memory page to an address space may be implemented in any manner similar to that described herein.

In step 304, a mode specified by a second value in the register (e.g., 104) is associated (or correlated) with the memory page. It is appreciated that the associating of the mode specified by the second value in the register with the memory page at step 304 may be implemented in diverse ways in accordance with the present embodiment. For example, the mode specified by the second value in the register may be correlated or associated with the memory page in any manner similar to that described herein.

At step 306 of FIG. 3, the mode (e.g., autopop) is applied to an operation involving the memory page. It is noted that the applying of the mode to the operation involving the memory page in step 306 may be implemented in a wide variety of ways in accordance with the present embodiment. For example, the mode may be applied to the operation involving the memory page in any manner similar to that described herein. Furthermore, the mode at step 306 may include, but is not limited to, any of the modes described herein. Once step 306 is completed, the present embodiment exits flowchart 300.

It is noted that flowchart 300 may be performed by the memory manager 110 of FIG. 1. Additionally, flowchart 300 may be performed by a microcontroller. For example, a microcontroller may be implemented with a circuit similar to memory manager 110.

Accordingly, the present invention provides a way to enable a microcontroller to pass information between its memory pages while not reducing the available memory within each memory page.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of memory management, said method comprising:

mapping a memory page to an address space based on a first value in a current page register;

associating a mode specified by a second value in said current page register with said memory page, wherein said mode is for minimizing the number of instructions issued by a processor;

accessing said memory page in response to an operation executed in accordance with said mode; and automatically mapping a previously-accessed memory page to said address space in accordance with said mode.

2. The method as described in claim 1, wherein said automatically mapping is performed after a defined amount of operations.

3. The method as described in claim 1, wherein said automatically mapping is performed after a defined amount of accesses to said memory page.

4. The method as described in claim 1, wherein said operation is a read operation, a write operation, an arithmetic operation, a logical operation or a move operation.

5. The method as described in claim 1, wherein said mapping and said associating are performed by a microcontroller.

6. A circuit for providing memory management, said circuit comprising:
- a current page register for storing a first value associated with a memory page and for storing a second value corresponding to a mode associated with said memory page, wherein said mode is for minimizing the number of instructions issued by a processor; and
- a logic circuit coupled to said current page register, said processor, and said memory page wherein said logic circuit is used for accessing said memory page in response to an operation executed in accordance with said mode and for automatically mapping a previously-accessed memory page to said address space in accordance with said mode.

7. The circuit of claim 6, wherein said logic circuit comprises a hardware state machine.

8. The circuit of claim 6, wherein said automatically mapping is performed after a defined number of operations.

9. The circuit of claim 6, wherein said automatically mapping is performed after a defined number of accesses to said memory page.

10. The circuit of claim 6, wherein said operation is a read operation, a write operation, an arithmetic operation, a logical operation or a move operation.

11. The circuit of claim 6, wherein said circuit is part of a microcontroller.

12. A system for providing memory management, said system comprising:
- means for mapping a memory page to an address space based on a first value within a current page register;
- means for correlating a mode specified by a second value within said current page register with said memory page, wherein said mode is for minimizing the number of instructions issued by a processor;
- means for accessing said memory page in response to an operation executed in accordance with said mode and for automatically mapping a previously-accessed memory page to said address space in accordance with said mode.

13. The system of claim 12, wherein said automatically mapping is performed after a defined number of operations.

14. The system of claim 12, wherein said automatically mapping is performed after a defined number of accesses to said memory page.

15. The system of claim 12, wherein said operation is a read operation, a write operation, an arithmetic operation, a logical operation or a move operation.

16. The system of claim 12, wherein said means for mapping said memory page and said means for correlating are part of a microcontroller.

* * * * *